Nov. 12, 1957     H. W. HAPMAN     2,812,924
CONVEYING DRYING APPARATUS
Filed May 19, 1952     3 Sheets-Sheet 1
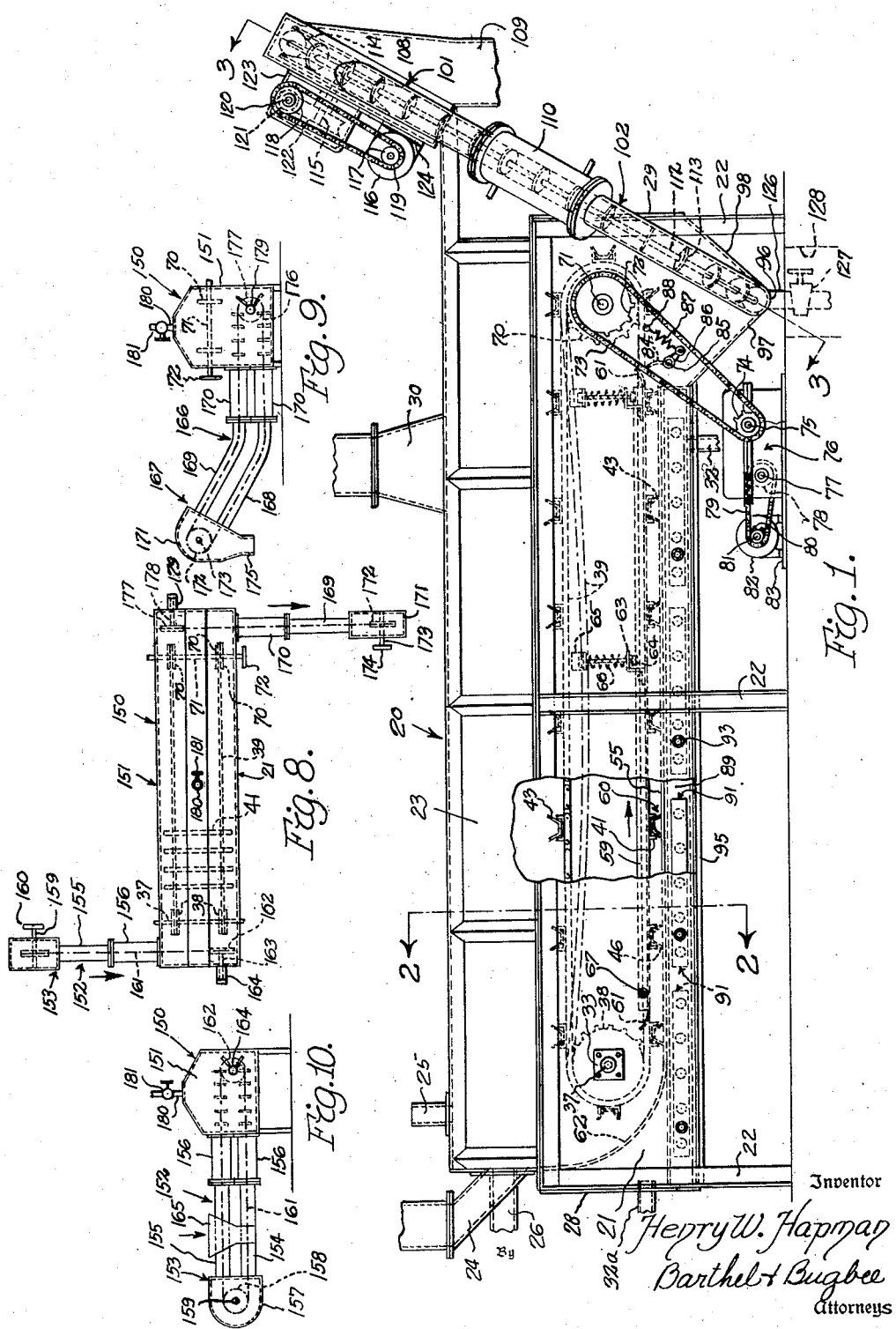
Inventor
Henry W. Hapman
Barthel & Bugbee
Attorneys

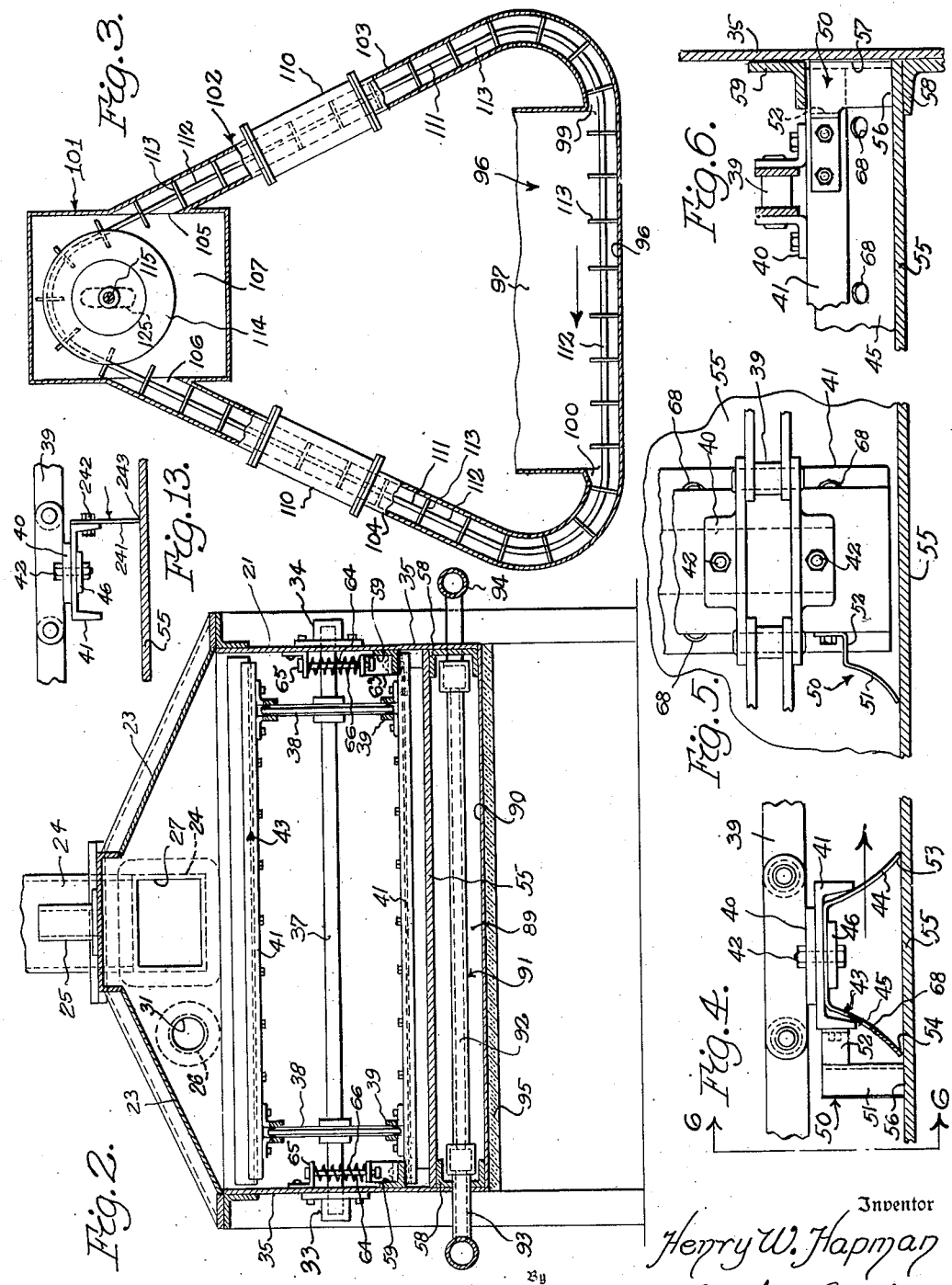

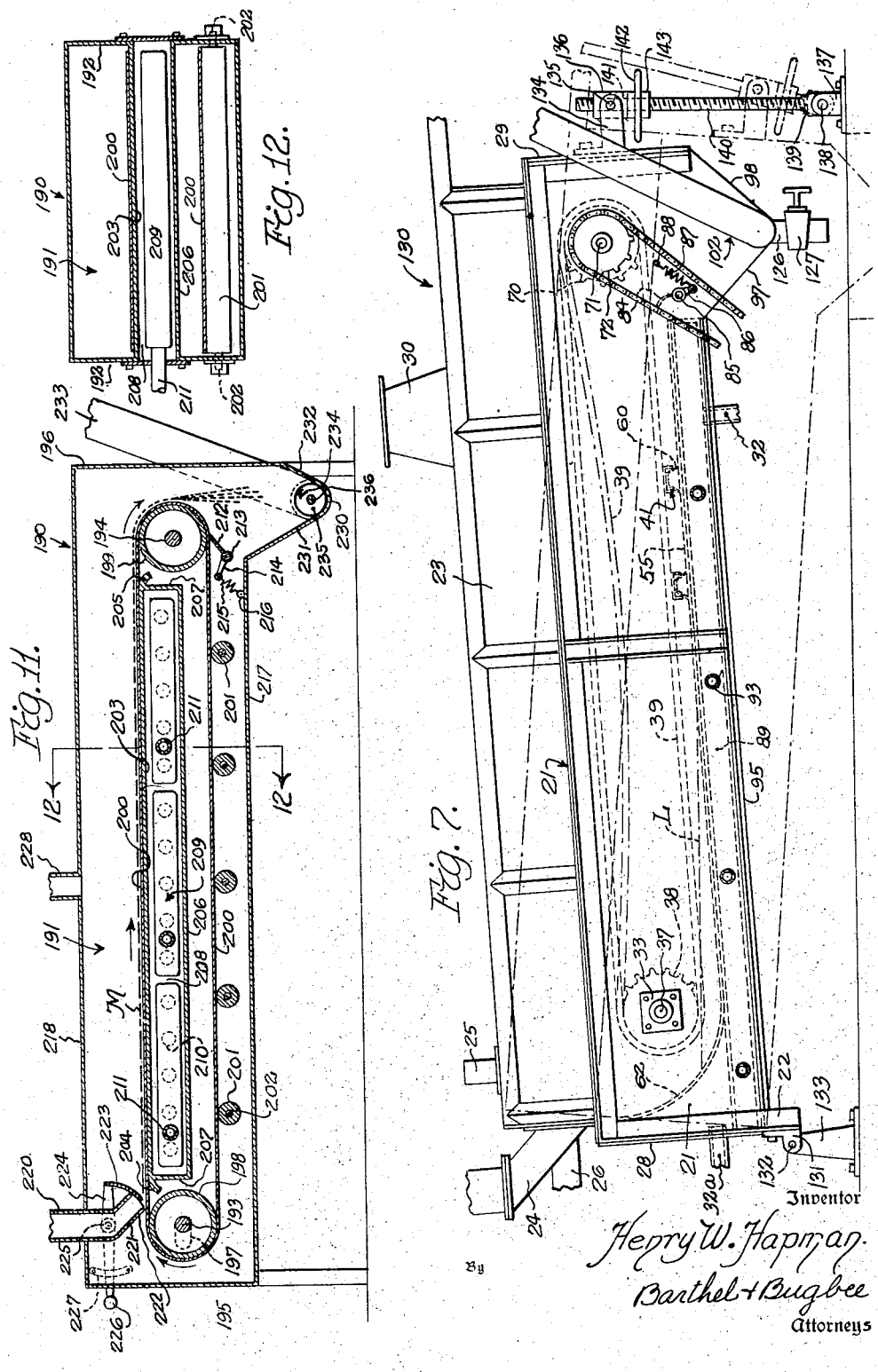

United States Patent Office 2,812,924
Patented Nov. 12, 1957

2,812,924

CONVEYING DRYING APPARATUS

Henry W. Hapman, Hickory Corners, Mich., assignor of forty percent to Hannah Jane Hapman, Hickory Corners, Mich.; Melvin S. Huffaker and Hannah Jane Hapman, executors of said Henry W. Hapman, deceased Application May 19, 1952, Serial No. 288,736

2 Claims. (Cl. 257—23)

This invention relates to drying apparatus and, in particular, to such apparatus where the material is conveyed while being dried, refrigerated, or otherwise heat-treated.

One object of this invention is to provide a conveying dryer which will dry a greater thickness of material while conveying it than it is possible to dry with the so-called drum dryer, which will dry only that thickness of material which adheres to the rotating drum.

Another object is to provide a conveying dryer which is especially adapted to the drying of food or chemical products without contaminating them because the design of the dryer is such that it is easily maintained in a clean and sanitary condition.

Another object is to provide a conveying dryer wherein the heating of the dryer is compact and easily regulated, so that accurate control can be exercised over the heating of the material during the drying operation.

Another object is to provide a conveying dryer which can be subjected to the application of gaseous or vapor pressure during the drying operation without the escape of such pressure from the drying chamber.

Another object is to provide a conveying dryer which will occupy a much smaller space, have less weight and be much less expensive to manufacture than a conventional rotating drum dryer for an equal drying capacity.

Another object is to provide a conveying dryer wherein the material to be dried is conveyed over an elongated flat table and subjected to the action of a series of elongated wiper blades of resilient material, such as spring steel mounted on endless conveyor chains so as to scrape the plate clean of material.

Another object is to provide a conveying dryer of the foregoing character which operates continuously under atmospheric conditions or under either pressurized or vacuum conditions, the dried material being carried away through an auxiliary conveyor and fresh material supplied to the drying chamber through another auxiliary conveyor.

Another object is to provide a modified flat plate dryer wherein the discharge end of the dryer can be raised and lowered so that when it is raised liquid can be retained in greater quantity at the opposite end of the dryer.

Another object is to provide a modified conveying dryer wherein the material is conveyed by an endless metal belt of steel or other suitable metal while the belt is being heated to accelerate the drying operation, the heat being preferably applied beneath the belt, this modified dryer being well adapted for the drying of materials which pass through a sticky state before becoming a dry powder.

Other objects and advantages of the invention will become apparent during the course of the following description of the accompanying drawings, wherein:

Figure 1 is a side elevation of a flat plate dryer, with one side of the housing broken away, and employing an endless conveyor with scrapers, according to one form of the invention, shown as optionally equipped for pressurized or vacuum operation;

Figure 2 is a cross-section taken along the line 2—2 in Figure 1;

Figure 3 is a vertically-inclined section through the auxiliary discharge conveyor taken along the line 3—3 in Figure 1;

Figure 4 is a fragmentary enlarged end elevation of one of the scrapers attached to the endless conveyor chain;

Figure 5 is a fragmentary top plan view of the portion of the scraper and conveyor chain shown in Figure 4;

Figure 6 is a fragmentary vertical cross-section taken along the line 6—6 in Figure 4;

Figure 7 is a side elevation of a modification of the flat plate dryer shown in Figure 1, wherein the discharge end of the dryer can be raised or lowered;

Figure 8 is a top plan view of a further modification of the conveying dryer shown in Figure 1 on a reduced scale, wherein the intake and discharge ends are provided with pressure-sealing devices;

Figure 9 is a right-hand end elevation of the conveying dryer shown in Figure 8 at the discharge end thereof;

Figure 10 is a left-hand end elevation of the conveying dryer shown in Figures 8 and 9 at the intake end thereof;

Figure 11 is a central longitudinal section through a still further modification of the conveying dryer of Figure 1, wherein the material is conveyed by an endless flexible metal belt and dried by heat applied to the belt;

Figure 12 is a cross-section taken along the line 12—12 in Figure 11; and

Figure 13 is a fragmentary enlarged end elevation of a modified scraper attached to the endless conveyor chain.

*Flat plate dryer with endless conveyor and scrapers*

Referring to the drawings in detail, Figures 1 to 6 inclusive show one form of conveying dryer, generally designated 20, according to one form of the invention as having a box-like elongated housing 21 supported upon legs 22 of angle or channel steel and equipped with a sloping roof or cover 23. The roof 23 is equipped with an inclined bulk feed intake conduit 24 at the intake end thereof, likewise a liquid feed conduit 25 and an air inlet conduit 26. A bulk feed intake opening or port 27 for the conduit 24 is also provided in the intake end wall 28 of the housing 21, and the air inlet conduit 26 is connected to a port 31 in the same wall 28. Mounted on the roof 23 of the housing 21 near the discharge end wall 29 thereof is a vapor vent stack or conduit 30. The casing 21 is provided with air inlet and outlet conduits 32 and 32a leading into the lower portions thereof. Journaled in bearing boxes 33 and 34 (Figure 2) in the opposite sides 35 of the housing 21 is a shaft 37 carrying a pair of idler sprockets 38 with endless chains 39. Secured to the sprocket chains 39 at intervals therealong are angle brackets 40 (Figure 6) to which in turn are bolted or otherwise secured channel members 41 (Figure 4). Secured to the underside of each channel member 41 as by the bolt 42 is an elongated wiper blade or scraper 43 of resilient material, such as spring steel, and of approximately channel cross-section with oppositely-inclined scraping flanges or sides 44 and 45, the scrapers 43 being anchored in position by bars 46.

Also secured as at 47 to the side flanges of the channels 41 are corner scrapers 50 consisting of inclined scraping portions 51 integral with angle arm portions 52 bolted to the channels 41. The forward and rearward scraping edges 53 and 54 of the scraping flanges 44 and 45 engage a flat elongated drying plate 55 which is also engaged by the lower scraping edge 56 of each corner scraper 50, the remaining scraping edge 57 of which scrapes the inner surface of each side wall 35 (Figure 6). The elongated drying plate 55 is supported on longitudinally-extending angle members 58 (Figure 6) and the channels 41 are guided at their opposite ends by longitudinal angle members 59 and held down thereby (Figure 6). In this manner, the scraper units, generally designated 60, which include both the plate scrapers 43 and the corner scrapers 50 are caused to be maintained in contact with the plate 55 during their entire path of travel along the plate (Figure 1).

The opposite ends of each angle member 59 are bent upwardly as at 61 to facilitate entry and exit of the scraper units 60. Leading downwardly to the drying plate 55 from adjacent the intake conduit 24 (Figure 1) is an arcuate approach portion 62 down which the material to be dried slides, so as to enter the rearward end of the flat plate 55 and be carried therealong by the scraper units 60. The angle members 59 carry angle brackets 63 spaced at intervals therealong on the opposite sides thereof (Figure 1), and these in turn are bored to receive guide bolts or pins 64 which are secured to and depend from angle brackets 65 bolted or otherwise secured to the side walls 35. Mounted on the bolts 64 are compression springs 66 disposed between the stationary and movable angle brackets 65 and 65, 59 respectively to yieldingly urge the scraper units 60 against the drying plate 55. Near one end, the angle members 59 are pivoted at 67 to the side walls 35 of the housing 21. The scrapers 43 have vapor vents 68 in their side walls.

The sprocket chains 39 at the delivery end of the housing 21 are mounted upon and driven by drive sprockets 70 which are mounted upon a cross shaft 71 journaled in the opposite side walls 35 of the housing 21 and carrying an external sprocket 72 driven by a sprocket chain 73 (Figure 1) from a sprocket 74 on the output shaft 75 of a reduction gear set 76. The input shaft 77 of the gear set 76 is driven by a sprocket 78 and sprocket chain 79 from a sprocket 80 on the shaft 81 of an electric motor 82, the motor 82 and the gear set 76 being mounted on a base 83. The scrapers 43 are freed from adhering material by a resilient wiper 84 (Figure 1) mounted on a shaft 85 which is resiliently urged toward the scraper unit 60 by crank arms 86 attached to tension springs 87, the opposite ends of which are anchored as at 88 to the sides 35 of the housing 21.

Mounted in a heater compartment 89 located between the drying plate 55, 62 and the bottom wall 90 of the housing 21 (Figure 2) are multiple heating units 91 which may be of any suitable type such as electrical, oil or gas-fired, steam, hot water, infra red or the like. For steam heating units 91, a heating coil 92 of zigzag or undulating form is provided having steam intake and discharge pipes 93 and 94 on opposite sides. Heating units 91 may be inserted or removed as required. The bottom 90 of the housing 21 is insulated by a heat-insulating layer 95. The apparatus 20 may be broadly described as a heat-treating apparatus, either for applying heat or extracting it, in which latter case the heating units 91 are replaced by conventional refrigerating units and may be broadly described as heat-exchanging units.

The housing 21 adjacent its discharge end 29 is provided with a transverse trough 96, the rearward wall 97 of which extends downwardly from beneath the forward end of the drying plate 55, the forward wall 98 extending upward to the forward wall 29 of the housing 21. The trough 96 on opposite sides is provided with inlet and outlet ports 99 and 100 respectively (Figure 3) to which is connected a flight conveyor unit 101 consisting of a conduit structure, generally designated 102, having inlet and outlet conduit portions 103 and 104 connected at their lower ends respectively to the ports 99 and 100 and at their upper ends to ports 105 and 106 respectively in the side walls of a discharge hopper 107 having a downwardly-extending spout 108 with a conduit 109 leading therefrom to a means of disposal for the dried material. Pressure-sealing devices 110 are inserted in each of the conduit portions 103 and 104 respectively. These pressure-sealing devices are for the purpose of sealing off the lower sections of the conduit portions 103 and 104 when it is desired to maintain a pressure above or below atmospheric pressure in the housing 21. The details of these pressure sealing devices 110 are outside the scope of the present invention, and various types may be used, examples of which are shown in the Hapman Patents Nos. 2,559,616 of July 10, 1951, for Pressure-Sealing Apparatus for Flight Conveyors and 2,564,599 of August 14, 1951, for Self-Sealing Conveyor Construction.

Mounted within the conduit structure 102 is an endless flight conveyor 111 consisting of an endless flexible propelling member 112 such as a cable or chain on which are mounted flights 113 at intervals therealong. The flights 113 may be made of metal, rubber-like material such as natural or synthetic rubber, or a combination of these materials, according to the particular demands of the installation. The conveyor flights 113 of rubber-like material are ordinarily preferred. The flight conveyor 111 is driven by a grooved drive wheel 114 mounted on a drive shaft 115 which is driven by a motor 116 (Figure 1) through sprockets 117, 118 and a sprocket chain 119, the sprocket 118 being mounted on a worm shaft 120 driving a worm 121 which meshes with a worm wheel 122 on the drive shaft 115. The motor 116 and gear box 123 containing the worm gearing 121, 122 are mounted upon a common base 124 which is slidably mounted upon the hopper 107 for tightening or loosening the flight conveyor 111, a slot 125 (Figure 3) being provided for this purpose. A drain pipe 126 in the lowest point of the trough 96, closed by a valve 127, facilitates draining or flushing out the apparatus, and discharges through a floor opening 128.

In the operation of the flat plate conveying dryer 20 shown in Figures 1 to 6 inclusive, the material to be dried is admitted through either of the conduits 24 or 25, depending upon whether the material is in a wet-solid or liquid condition respectively. Heat is of course supplied to the heating units 91 to heat the drying plate 55 and the motors 82 and 116 are started in operation to cause the endless conveyor chains 39 and flight conveyor 111 to travel in their orbital paths. As the conveyor chains 39 are thus driven, their lower courses in traveling over the drying plate 55 cause the scraper units 60 to engage the material coming down the arcuate approach portion 62 toward the drying plate 55 and propel it along the latter. As the wet or damp material is moved along the elongated heated drying plate 55, the heat supplied thereto by the heating units 91 expels the moisture from the material so that when it reaches the forward end of the drying plate 55, it is in a sufficiently dry condition to be discharged. During the travel of the material along the heated drying plate 55, the material is scraped from the plate 55 and side walls 35 by the scraping edges 53, 54 and 56, 57 of the scrapers 43 and 50 respectively (Figures 4 to 6 inclusive). In this manner, material which goes through a sticky condition in its transformation from a wet to a dry material is prevented from adhering to the drying plate 55 and side walls 35. Furthermore, the thickness of the layer of material which passes over the drying plate 55 and is dried thereby is in no way dependent upon the capability of the material to adhere, as in the case of drum dryers previously used, hence much thicker layers of material can be dried by the present invention than can be dried by conventional drum dryers.

The springs 66, by urging the guide bars 59 downward, apply downward pressure to the scrapers 43 and thereby assist in preventing adhesion of the material being dried to the drying plate 55.

When the dried material reaches the forward end of the drying plate 55, it is pushed off the latter by the scrapers 43 and falls down the inclined side wall 97 of the trough 96 into the path of the flights 113 of the endless flight conveyor 111, being carried thereby through the conduit portion 104 (Figure 3) and pressure sealing device 110 through the port 106 in the hopper 107, falling by gravity downward through the spout 108 and conduit 109 (Figure 1). The conveyor 111, freed of the conveyed material, travels downward from the driving wheel 114 through the port 105, conduit portion 103 and pressure sealing device 110 through the port 90 to the trough 96, repeating the foregoing cycle indefinitely until the apparatus is halted. Meanwhile, the vapors or gases resulting from the drying operation are carried away by the vent 30 located in the roof 23 of the housing 21.

Tiltable flat plate dryer

The tiltable flat plate dryer, generally designated 130 (Figure 7), is, so far as its upper portions are concerned, similar to the dryer 20 shown in Figure 1, both in construction and in general operation. Accordingly, the same reference numerals are used for corresponding parts. In the tiltable dryer 130, the rearward legs 22 are provided with brackets 131 bolted or otherwise secured thereto and having pivot pins or a pivot shaft 132 supported thereby. The latter are in turn supported by a bracket or brackets 133 rising from the floor and bolted or otherwise secured thereto.

Bolted or otherwise secured to the discharge end wall 29 of the housing 21 is a bracket 134 carrying pivot pins or trunnions 135 upon which a sleeve 136 is pivotally mounted. Bolted or otherwise secured to the floor is a bracket 137 carrying a pivot pin 138 upon which the lower end 139 of a screw shaft 140 is pivotally mounted. The upper end of the screw shaft 140 passes through the bore 141 in the sleeve 136 beneath which is mounted a hand wheel 142 having an internally-threaded hub 143 threaded upon the screw shaft 140.

The operation of the modified tiltable flat plate dryer 130 is for the most part the same as that described above in connection with the flat plate dryer 20, except that the discharge end of the housing 21 may be raised and lowered so that liquid can be retained in a greater quantity at the intake end of the dryer. The liquid level, for example, is shown by the dotted line L in Figure 7, with the housing 21 raised at its discharge end 29. To lower the discharge end 29, the operator rotates the hand wheel 142 so as to move the hub 143 downward along the screw shaft 140, permitting the sleeve 136 and bracket 134 to move downward under the influence of gravity. When the discharge end 39 of the housing 21 is thus lowered, the liquid level L will be altered.

Modified dryer with complete pressure-sealing

The modified flat plate dryer, generally designated 150, shown in Figures 8, 9 and 10 is different from the flat plate dryer 20 of Figures 1 to 6 inclusive principally in providing completely sealed conveyors for admitting the wet material and discharging the dried material. The central or dryer portion proper, generally designated 151, of the apparatus is substantially the same in construction and operation as that shown in Figure 1, and hence requires no repetition of description. Similar reference numerals designate similar portions of the apparatus. In place of the intake conduit 24 or 25 of Figure 1, the modified dryer 150 is provided with an intake or supply conveyor, generally designated 152, consisting of an approximately U-shaped conduit structure 153 including forward and return conduits 154 and 155 equipped with pressure-sealing devices 156 similar to the sealing devices 110 described above and connected to one another by a sprocket casing 157 containing a drive sprocket 158 mounted on a drive shaft 159. The latter carries a pulley or sprocket 160 which is driven by a motor (not shown) in any suitable way.

Mounted within the conduit system 153 is an endless flight conveyor 161 supported on the drive sprocket 158 and upon an idler sprocket 162 mounted on a shaft 163 which is journaled in an idler sprocket bearing 164. An intake or supply hopper 165 opens downward into the forward conduit portion 154 for supplying wet material thereto.

The opposite or discharge end of the machine is provided with an outlet or discharge conveyor 166 which is generally similar in construction to the supply conveyor 152 in that it has a conveyor conduit system 167 including normally-inclined forward and return conduit portions 168 and 169 provided with pressure-sealing devices 170 and a combined sprocket housing and discharge hopper 171 containing a drive sprocket 172 mounted on a drive shaft 173 having a drive pulley or sprocket 174 driven by a motor (not shown). The discharge hopper 171 is provided with a discharge conduit 175 through which the dried material is discharged into a receptacle, container or conveyor, as desired. A flight conveyor, generally designated 176, is mounted within the conduit system 167 and driven by the sprocket 172 and supported at its opposite end by an idler sprocket 177 mounted on a shaft 178 journaled in a sprocket shaft bearing 179. The flight conveyors 161 and 176 are of conventional construction similar to the flight conveyor 111 discussed above. A pipe 180 leads upward from the roof 23 of the housing 21, and is equipped with a valve 181.

The operation of the modified dryer 150 is similar to that of the dryer 20 described in connection with Figures 1 to 6 inclusive and hence requires no repetition of description. The dryer 150, however, may be operated under pressure or vacuum conditions, because the sealing devices 156 and 170 prevent entrance or escape of pressure while the material is being conveyed into or out of the apparatus.

Endless belt dryer

The modified dryer, generally designated 190, shown in Figures 11 and 12 also provides continuous drying of the material but does so by carrying the material upon an endless metal belt, as described below. The dryer 190 includes an elongated box-like housing 191 having opposite side walls 192 in which shafts 193 and 194 are journaled near the opposite end walls 195 and 196 respectively. The shaft 193 is movably mounted in slots 197 for belt slack takeup purposes. Mounted on the shafts 193 and 194 are drums 198 and 199 around which is trained an endless metal belt 200 preferably of steel or other flexible metal. The lower course of the belt 200 is supported on rollers 201, the spindles or axles 202 of which are journaled in the opposite side walls 192 of the housing 191. The upper course of the belt 200 moves along the top of an elongated metal plate 203 having downwardly-turned opposite ends 204 and 205 and spaced apart from a lower plate 206 by end walls 207. Within the chamber 208 formed by the plates 203 and 206, the ends 207 and the side walls 192, are mounted heating units 209 containing heating coils 210 supplied with steam or other heating medium through pipes 211, in an arrangement similar to that shown at 91 in Figure 1. Mounted beneath the drum 199 at the discharge end of the belt 200 is a scraper 212 which extends across the belt and is pivotally mounted on a shaft 213 journaled in the side walls 192 of the housing 191. A crank arm 214 assisted by a tension spring 215 connected thereto at one end and to an eye 216 on the bottom wall 217 at its other end, rocks the shaft 213 and yieldingly urges the scraper 212 upwardly against the belt 200. This prevents the carrying over of material which would otherwise adhere to the belt 200.

In order to supply material to be dried, the upper or top wall 218 is provided with an intake or supply conduit 220 having an inclined portion 221, the end 222 of which is arcuately curved for engagement by an arcuately curved damper or valve member 223. The latter is mounted on the end of a hand lever 224 which is pivoted at 225 upon the center of curvature of the portions 222 and 223 and is provided with a handle knob 226 and an arcuate guide and detent member 227. A vent 228 is also provided in the upper wall 218 in order to permit escape of vapors or other gases expelled from the material being dried.

Immediately beneath the drum 199, the bottom wall 217 joins a trough 230 with opposite walls 231 and 232 respectively. An endless flight conveyor unit, generally designated 233, similar to the flight conveyor unit 101 and constructed in a similar manner, has a flight conveyor 234 traversing the trough 230 and including spaced flights 235 mounted on an endless propelling member 236, such as an endless cable or chain.

In the operation of the modified dryer 190, material to be dried is supplied to the conduit 220 and falls through the opening at the lower end 222 of the inclined portion 221 thereof onto the endless steel belt 200, which is caused to travel in an orbital path by power applied to the shaft 194. As the material is carried along by the upper course of the belt 20 (as indicated by the dotted lines M), the belt 200 is heated by the heating units 209 by conduction through the wall or upper plate 203. As the material M travels from the intake conduit outlet end 222 toward the drum 199, the liquid therein is vaporized and expelled, passing outward through the vent 228. When the material arrives above the drum 199, it is in a satisfactorily dry condition, as determined by the speed at which the belt 200 is operated and the speed at which the material M is supplied to the conduit 220. When the dried material reaches the drum 199, it drops off the end of the belt 200, as indicated by the dotted lines at the right-hand end of Figure 11, and drops down into the trough 230. From the latter, it is picked up by the flights 235 of the flight conveyor 234 and carried to a receptacle or other container for receiving the dried material.

The modified scraper 240 shown in Figure 13 consists of a strip 241 of sheet metal, either rigid or resilient, bolted as at 242 to one of the flanges of the channel member 41 and having a scraping edge 243. If the scraper strip 241 is rigid, the resilience is provided by the resilient mounting springs 66.

In the forms of the invention employing the drying plate 55 with its arcuate approach portion 62, the members 55, 62 may be formed of stainless steel with their side edges welded to the sides 35 of the housing 21. This construction is especially suitable for drying food products and chemicals since no pockets exist for lodging of the material being dried and a single plate serves as the bottom and end of the drying surface. Where the drying apparatus is of the type shown in Figure 7 with one end capable of being raised or lowered, the maximum depth of liquid to be dried out occurs at the forward or inlet end of the drying plate 55 adjacent its junction with its arcuate approach portion 62, as shown by the liquid level line L in Figure 7.

What I claim is:

1. A conveying heat-treating apparatus comprising an elongated housing, rotatable conveyor supporting and driving elements disposed in horizontally-spaced relationship within said housing, a main endless flexible material conveyor mounted on said elements, an elongated substantially flat heat-exchanging table disposed adjacent said conveyor, said conveyor having material-moving elements drivingly connected thereto and extending thereacross into engagement with said table for moving treated material therealong, elongated conveyor guide members movably mounted in said housing and engaging said conveyor, resilient elements engaging and urging said conveyor guide members and said conveyor and said material-moving elements toward and into yielding engagement with said table, a heat exchanger disposed adjacent and extending along a portion of said table, a driving motor, and driving mechanism drivingly connecting said motor to one of said elements.

2. A conveying heat-treating apparatus comprising an elongated housing, rotatable conveyor supporting and driving elements disposed in horizontally-spaced relationship within said housing, a main endless flexible material conveyor mounted on said elements, an elongated substantially flat heat-exchanging table disposed adjacent said conveyor, said conveyor having material-moving elements drivingly connected thereto and extending thereacross into engagement with said table for moving treated material therealong, elongated conveyor guide members engaging said conveyor, resilient elements engaging and urging said conveyor guide members and said conveyor and said material-moving elements toward and into yielding engagement with said table, said guide members being pivotally mounted adjacent one end thereof in said housing and having their opposite ends swingable relatively to the pivots thereof, a heat exchanger disposed adjacent and extending along a portion of said table, a driving motor, and driving mechanism drivingly connecting said motor to one of said elements.

References Cited in the file of this patent

UNITED STATES PATENTS

| | | |
|---|---|---|
| Re. 16,699 | Cano | Aug. 9, 1927 |
| 438,054 | Bonneville | Oct. 7, 1890 |
| 546,830 | Smith | Sept. 24, 1895 |
| 890,684 | Moul | June 16, 1908 |
| 1,237,708 | Schuyler | Aug. 21, 1917 |
| 1,580,658 | Field | Apr. 13, 1926 |
| 1,958,661 | Fulmer | May 15, 1934 |
| 2,360,100 | Bowen | Oct. 10, 1944 |
| 2,510,221 | Harcourt | June 6, 1950 |
| 2,515,098 | Smith | July 11, 1950 |
| 2,528,476 | Roos et al. | Oct. 31, 1950 |
| 2,531,578 | McIlvaine | Nov. 28, 1950 |
| 2,662,742 | Douglass et al. | Dec. 15, 1953 |